Aug. 25, 1964        W. H. HENSHAW        3,146,058
RECORDING PEN AND INK SUPPLY SYSTEM
Filed July 6, 1961
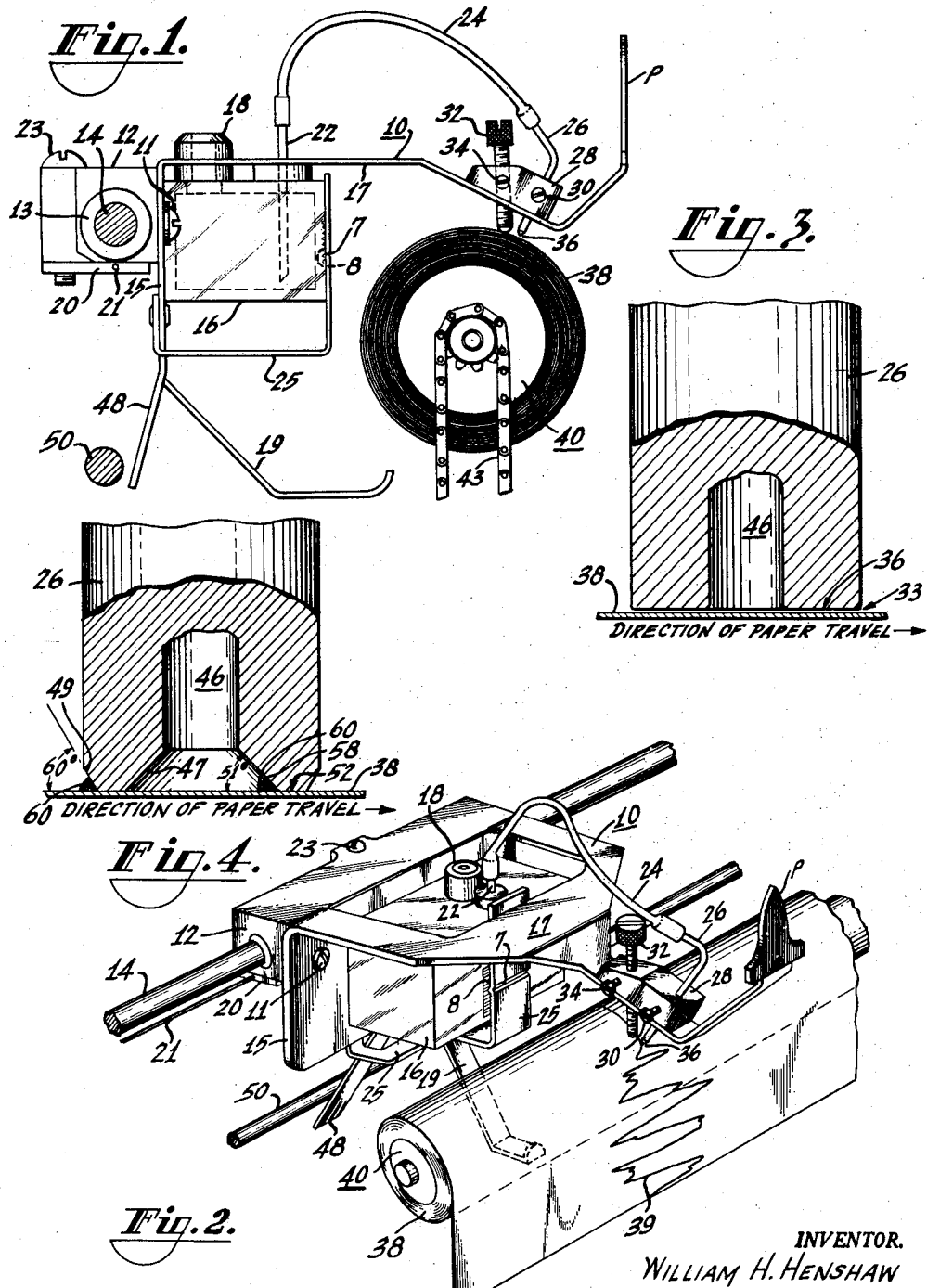
INVENTOR.
WILLIAM H. HENSHAW
BY
C. A. Weigel, Jr
ATTORNEY United States Patent Office 3,146,058
Patented Aug. 25, 1964

3,146,058
RECORDING PEN AND INK SUPPLY SYSTEM
William H. Henshaw, Hopewell Junction, N.Y., assignor, by mesne assignments, to Esterline Angus Instrument Company, Inc., Indianapolis, Ind., a corporation of Delaware
Filed July 6, 1961, Ser. No. 122,336
16 Claims. (Cl. 346—140)

This invention relates to improvements in automatic indicating and recording apparatus and more particularly to a novel recording pen of the type generally used in chart recorders.

Typically, chart recording instruments continuously measure and record the magnitude of variable physical conditions; such as, temperature, light, or other physical phenomenon. The magnitude of such physical conditions may be determined by the output of thermocouples, photoelectric cells, or any device that produces a measurable electrical output signal within the range of the instrument. Alternatively, such recording instruments may be actuated by a mechanical input signal derived, for example, from a bourdon tube which is sensitive to pressure variations. In either case, as well as that where a manual input is provided, the characteristics of the variable being measured or indicated may be recorded upon a chart or other writing surface such as a plotting board by means of an ink pen. Typically, the nib or stylus of the ink pen is in contact with the writing surface. The pen usually is driven across either a circular or strip chart in a direction transverse to the direction of chart movement.

The pens used in present day recorders are generally an integral unit including a glass ink reservoir and a nib or stylus. When a glass ink reservoir is used, it is usually necessary to form the nib out of a metal alloy (typically, 90% platinum and 10% iridium) capable of providing a good glass-to-nib seal. Unfortunately, these alloys are usually soft and wear very rapidly and are easily bent in use. The result of such wear or deformation is poor quality, intermittent, or arrested writing.

Other difficulties encountered with present day pens are skipping, soaking (blotting or bleeding), or tearing of the chart paper. These difficulties are complicated further by either insufficient or excessive ink flow. For example, wet charts tear from contact with the writing element and lint fibers are easily loosened from the writing surface, or paper, by the scraping action of the nib. These wet, loose, lint fibers clog the bore of the nib. Periodic cleaning is necessary to keep the pen writing. In the integral unit type pen, the clogged nib can be unplugged only by pushing the clogging material back into the stem of the pen. This has a disadvantage in that later this material often works its way back into the nib to clog the pen again.

One cause of improper ink flow is that there are no readily available means of adjusting the ink flow relative to the writing speed since many prior art pens are constructed having the ink reservoir integral with the pen nib. With no means available for adjusting the ink flow for fast writing speeds, the nib tends to skip. Conversely, for slow writing speeds, the paper becomes relatively soggy from too much ink resulting in tearing of the paper and clogging of the nib.

Nibs made of the platinum, iridium alloy to facilitate the glass-to-metal seal, are relatively expensive. Also, these glass vials require glass blowing which is expensive in itself. If the pen becomes cracked or damaged, these relatively expensive nibs, once sealed into the glass, cannot easily be removed for any re-use.

Pen pressure on the chart is usually controlled from a point remotely related to the writing surface of the chart. Also, typically, the chart roll is supported on one frame of the instrument while the pen pressure reference is a rod supported on a different frame. Under these conditions, any variations due to misalignment of the rod to its frame, or the chart to its frame, or the frames to each other, and variations due to other things such as eccentricity of the chart roll's surface with respect to the chart roll axis, all tend to cause the pen pressure to vary over a relatively wide range. Such variations in pen pressure cause corresponding undesired variations in writing and wear of the pen.

Accordingly, it is an object of this invention to obviate many of the disadvantages of the prior art.

Another object of this invention is to reduce the nib wear of ink pens used in recorders and the like.

Another object of this invention is to improve the pen carriage mechanism for chart recorders thereby to allow increased writing speed without the attendant dangers of skipping, bleeding or tearing of the chart.

Another object of the invention is to afford independent adjustment of a recording pen to accommodate different writing speeds and conditions by individual variation of the pen and a separate ink reservoir.

This invention may find use in a recorder of the type including a pen and a chart movable with respect to the pen. In accordance with the invention, an adjustable foot is secured to the frame of the pen carriage of the recorder. This adjustable foot is mounted on the pen carriage so as to maintain a predetermined gap or space between the pen nib and the chart. The gap may be adjusted such that the pen nib makes substantially no contact with the chart. This pen type which results from mounting the pen nib just off-the-surface of the chart roll may be referred to as a space pen. Such space pen virtually eliminates nib wear and bending, allows increased writing speed, employs inexpensive materials for the nib, and substantially removes the danger of the pen's clogging, blotting, or tearing the chart paper.

In a preferred embodiment of the invention, the ink for the pen nib is stored in an ink reservoir, or vial, separate from the nib itself. Ink for the nib is supplied through a capillary tube. By adjusting the level of the ink reservoir with respect to the level of the nib, the ink flow to the nib may be regulated for different nib-to-paper gaps and writing speeds. In still another embodiment of the invention, the nib is conical to allow conventional "on paper" writing, but with reduced danger of clogging, bleeding, blotting, skipping and other disadvantages of the prior art pens.

Further advantages and features of this invention will become apparent upon consideration of the following description read in conjunction with the drawings wherein:

FIGURE 1 is a side view of one embodiment of a space pen and carriage therefor constructed in accordance with this invention for use with a conventional chart-type recorder;

FIGURE 2 is a perspective view of the same space pen and pen carriage illustrated in FIG. 1;

FIGURE 3 is an enlarged and partially cut-away view of the nib of the space pen of FIG. 1 constructed in accordance with this invention; and FIGURE 4 is an enlarged and partially cut-away view of a nib for a recording pen constructed in accordance with another embodiment of this invention.

Reference is now made to FIGS. 1 and 2 which show the pen carriage portion of a conventional chart recorder constructed in accordance with this invention. Also shown are those essential portions of the recorder necessary to support and position the pen carriage and the chart roll. A conventional recorder in which the pen carriage of this invention may be used is described, for example, in the "Installation, Operation and Service Instructions for the Daystrom-Weston Single Point Recorder, Model 6701," copyright 1959 by Daystrom, Incorporated.

The pen carriage of FIGS. 1 and 2 comprises a pen carriage frame member 10 that is punched and formed from sheet stock and affixed to a rectangular bearing member 12 by suitable securing means 11. The bearing member 12 has an axial hole extending therethrough and each end of the bearing member 12 is fitted with a bearing 13 whereby the entire pen carriage mechanism may slide along a slide rod 14 in a direction perpendicular to the plane of the drawing of FIG. 1. The frame member 10 is L-shape in cross-section and includes a base section 15 and a horizontal arm 17 extending from the base section 15 to the right, or forward, section of the right horizontal arm 17 being bent downwardly and then upwardly to form a V and is pointed to form a pointer P. The lower portion of the base section 15 has two arms, a cam arm 19 of the type described in U.S. Patent No. 2,673,138, issued to H. C. Bartley, et al., and a blade arm 48. The cam arm 19 is bent to the right, or forward, and thence upwardly so as to cooperate with a tie rod (not shown) which is movable as a unit with the chart roll 38 in a horizontal plane. Its function is the conventional one, as described by Bartley, et al., of raising the pen carriage as the chart roll 40 is moved to and from its operating position. The blade arm 48 is bent downward and slightly to the left in the drawing to cooperate with a support rod 50 thereby to prevent the pen carriage from falling when the chart roll 38 is removed. Actually, the cam arm 19 may be eliminated if desired. The V-shape of the horizontal arm 17 serves to raise the pen carriage as the chart roll 38 is moved into position.

A U-shaped member 25 punched and formed from sheet stock is secured at one end to the frame member 10 by any suitable means (a rivet is illustrated) to accommodate a rectangular-shaped ink reservoir or vial 16. The vial 16 desirably may be of a thin, clear plastic, such as one of the acrylic resins, to facilitate viewing the ink level and completely enclosed so as to prevent the ink from spilling over the sides as the pen carriage is moved rapidly. A baffle 18 is placed in the top portion of the ink vial 16 so as to accommodate filling of the vial 16, to prevent spilling of ink when the carriage (at fast pen speeds) stops, and also to provide an air vent to permit its being emptied. The ink vial 16 is secured by the pressure of the U-shaped member 25. The U-shaped member 25 may include a notch 7 positioned to cooperate with a notched band 8 on the ink vial 16. The ink vial 16 may be adjusted vertically to a desired level, or height, by this U-shaped member 25 as will be described hereinafter. The term "ink" is employed in a generic sense to include any fluid or other suitable semi-viscous material, of various colors, that can be used for writing.

A tube 22 inserted through the top portion of the ink vial 16 allows ink to be withdrawn therefrom. A plastic capillary tube 24 feeds the ink from the tube 22 in the vial 16 to the feed end of a nib 26. For the purposes of this description, the ink vial 16, the tube 22, the capillary tube 24 and the nib 26 may be considered as comprising the ink pen. The nib 26 is secured to the frame member 10 just to the rear of the pointer P by inserting it through a block assembly 28 which is fixedly mounted on the V portion of the frame member 10. The nib 26 may be any type of capillary size tube having a bore of sufficient diameter to allow the ink to flow therethrough. The nib typically may be of stainless steel tubing of the general type and size employed in hypodermic needles, cut to the proper length and bent, if necessary, to accommodate the capillary tube 24. The writing end 36 of the nib 26 may be polished slightly so as to provide a smooth surface, as illustrated in the enlarged view of the writing end of the nib 26 in FIG. 3. A set screw 30 in the block 28 allows the nib 26 to be either removed or fixed in position.

A gap adjusting foot 32 (which may, for example, be a set screw with a properly shaped and polished end to permit it to slide across and not tear the chart 38) is threaded through the block 28 and fixed in position by a set screw 34. The gap adjusting foot 32 is adjustable to maintain a gap, or space 33 (FIG. 3), between the nib 26 and the writing surface, typically, the chart paper 38 mounted on the chart roll 40. In this manner no part of the ink pen need touch the chart paper 38.

The chart roll 40 is driven in a conventional manner by a means not shown. The chart paper 38 is moved with respect to the pen nib 26 such that a trace or mark 39 is left on the chart paper 38 to record the position of the pen and hence provide a record of the temperature, or other input variable being measured and recorded. The gap 33 (FIG. 3) may be varied by the adjustment of the gap adjusting screw 32 which raises or lowers the nib 26 with respect to the chart paper 38. The gap adjusting foot 32 preferably is positioned to contact the paper 38 as close to the point of writing as is physically possible.

In the partially cut-away view of FIG. 3, the nib 26 is seen to have a bore 46, which is of capillary size, i.e., in the order of thousandths of an inch, and a land portion 36 which constitutes the writing end of the nib 26. The gap 33 between the paper 38 and the land 36, created by adjustment of the gap adjusting foot 32, is also typically of capillary size.

The pen carriage mechanism of FIGS. 1 and 2 is slidable upon the slide rod 14 by the movement of the driving cable 21 in one direction or the other, the cable 21 being fastened to the rectangular bearing member 12 by any suitable means such as the cable clamp 20 fastened by the screw 23. Those skilled in this art will understand that the movement of the pen carriage mechanism is effected by the mechanical input signal or by a suitable power means, typically during the re-balancing of the electrical bridge network either of which is sensitive to the variations in the conditions being measured and/or recorded. The pen nib 26 draws a corresponding trace 39 on chart paper 38, the latter being unrolled at a constant rate by suitable motor driven means (not shown).

To operate the pen of the invention, the ink vial 16 is filled with ink through the baffle 18 by means of a "squeeze" bottle, for example (the baffle may be removable for filling with eye dropper or other means). After filling the ink vial 16, by depressing the "squeeze" bottle and passing ink into the vial 16, the ink is forced up through the feed tube 22 and the capillary tube 24 to the nib 26. The paper 38 is placed upon the roll 40, and the chart frame (not shown) is positioned such that the pen carriage of FIG. 1 allows the nib 26 to rest on the chart paper 38. Once ink is forced into the nib 26 and ink flow to the paper 38 is established, the gap adjusting foot 32 is adjusted to establish a gap 33. This gap 33 (FIG. 3), between the nib 26 and the paper 38, is adjusted and maintained by the gap adjusting foot 32 to accommodate the desired writing speed.

Ink flow to the paper 38 is maintained by the capillary action of the capillary tube 24 and the gap 33 and the adhesive force by which the ink adheres to the chart paper 38 once contact is made. In practice it has been found that the normal vibration present in most industrial installations is sufficient to establish ink flow to the paper. For slow to normal writing speeds (two seconds for ten inch full scale pen response), the gap 33 (FIG. 3) typically may be adjusted to approximately .001 inch to obtain the desired ink flow. For faster than two seconds full scale response in writing, the nib 26 is typically adjusted still closer to the paper, say in the order of several tenths of thousandths of an inch. This adjustment is determined relatively simply by decreasing the gap 33 (FIG. 3) by adjustment of the gap adjusting foot 32 until skip tracing of the nib 26 across the chart paper 38 ceases at the desired writing speed. The size of the gap 33 that is necessary to obtain a given writing speed will vary with different inks, nibs, and writing surfaces, but may always be adjusted as described to accommodate these variables.

Further, in accordance with the concept of the present invention, the rate of ink flow for a desired pen writing speed is controllable by adjusting the level of the ink reservoir 16 (and hence the level of the ink in the reservoir) with respect to the level of the nib 26. Stated in another manner, the adjustment of the level of the ink reservoir 16 with respect to the level of the nib 26, acts as a vernier adjustment to the gap adjustment. For example, the level of the ink reservoir 16 may be adjusted to give wider or narrower (darker or lighter) traces 39 on the chart paper 38 as desired. Basically, the width of the traces 39 is determined by the outside diameter of the nib 26; the ink being drawn to the periphery of the nib 26 by the cohesive and adhesive forces within the ink and between the ink and paper or nib, respectively. If the gap is too wide for a particular writing speed, these forces may not be sufficient to draw ink rapidly enough to provide a full width trace, thereby possibly causing skipping in the trace 39. Such skipping is readily prevented either by decreasing the gap 33 or by raising the level of the ink vial 16 with respect to the nib 26 to increase the ink flow.

In accordance with the concept of this invention, the nib 26 need not touch the chart paper 38, allowing relatively fast writing speeds, and substantially reducing wear of the nib which in conventional pens is both a maintenance problem and a significant element of expense. Further, in operation of the present invention, lint particles are not scraped up from the paper by the nib 26 minimizing the danger of clogging. The tendency of the nib 26 to blot or tear the charts 38 is reduced since the nib, properly adjusted in accordance with the concept and teaching of the present invention, is not in contact with the paper and does not disturb the fibers or surface of the paper. Moreover, the relatively costly, easily bent, soft and rapid wearing metal alloy nibs of prior art pens are not employed by the present invention for reasons enumerated hereinafter.

The novel pen assembly of this invention has a further significant advantage in that it is easily cleaned. In many present day glass pens, the reservoir is generally integral with the nib assembly. Any attempt to clean these pens usually forces the particles back into the reservoir from which they can again cause clogging. In accordance with this invention, the nib 26 is relatively easily cleaned simply by removing the capillary tubing 24 and pushing the clogging material out of either end of the nib 26.

In another embodiment of the invention, the nib 26 may be contoured to provide additional advantages to the user with either "off-paper" writing, i.e., where a finite gap 33 is maintained and no part of the nib is in physical contact with the paper, or "on-paper" writing, to the extent that the gap 33 is reduced so that the nib 26 is in partial contact with some fibers of the writing material. Those skilled in the art will recognize that writing surfaces such as paper are not absolutely smooth, but have minute protruding fibers which in fact can perform the useful function of drawing ink from a pen. In the "on-paper" mode of use of the present invention, it is these minutely extending fibers which the nib 26 primarily contacts. If the user desires, conventional "on-paper" writing may be had by appropriate adjustment so that the nib 26 is wholly in physical contact with the writing surface. In FIG. 4 the contoured writing end of the nib 26 is illustrated in an enlarged and partially cut-away view as having a conical recess 47 at the end of its bore 46. This conical portion 47 is here illustrated as having a 51° meet angle with respect to the writing surface or chart paper 38. Also the lower periphery 49 of the nib 26 is bevelled to have a 60° meet angle with respect to the chart paper 38. This leaves a greatly reduced land area 52 on the bottom of the nib 26, and at the same time provides an additional volume immediately adjacent the paper 38 in which ink may collect so as to insure a continuous and adequate flow of ink.

With a nib 26 contoured, as illustrated in FIG. 4, the user may even reduce the gap 33 substantially to zero by the gap adjusting foot 32 to permit improved "on-paper" writing such as occurs with conventional pens. Also illustrated in FIG. 4 are lint particles 60 which normally accumulate when the gap 33 is reduced essentially to zero for such on-paper writing. Actually, due to the relatively rough surface of most paper, some line particles 60 tend to accumulate on the nib 26 even with "off-paper" writing. These lint particles 60 accumulate at the leading edge of the nib 26 and also at the trailing edge of the conical section 47 of the bore 46 due to the relative motion between the chart paper 38 and the nib 26. By thus contouring the nib 26, these lint particles 60 are forced into the acute angles 58 formed by the paper 38 and the conical section 47, and by the paper 38 and the bevelled edge 49 of the nib 26, respectively. Under these conditions, movement of the paper 38 easily pulls the particles 60 out from under the nib 26 such that the nib 26 in effect "sleigh-rides" over these particles 60 and their tendency to clog is reduced even if the user adjusts to "on-paper" writing.

The conical portion 47 of the nib 26 has an additional advantage for "off-paper" writing, in that it provides a space wherein a greater volume of ink can collect. This increased volume of ink permits larger gaps 33 to be used with less critical adjustment of the gap adjusting foot 32 and will bring about less danger of skip tracing.

The nib 36 does not have to have a conical recess, but may simply be enlarged, such as by counter boring the bore 26 to provide an enlarged opening immediately adjacent to the paper 38. Obviously, other means of enlarging the end of the bore 46 will be apparent to those skilled in the art.

In both of the embodiments of the invention illustrated in FIGS. 3 and 4, the ink vial 16 may be elevated such that the level of the ink in the vial is above the nib 26. This action creates a positive "head" on the ink in the bore 46 of the nib 26. In turn, the positive "head" causes the ink in the bore 46 to drop down below the land portion (52 in FIG. 4) of the nib 26 and permits a slight convex surface of the ink to extend below, or beyond, the bottom of the nib 26. This convex surface, or meniscus, has the advantage of permitting greater writing speeds with less danger of skip tracing.

There has thus been described a novel ink pen that may be used on recorders. This ink pen obviates many of the disadvantages of many present day pens, such as clogging, wearing, bending, skipping at fast writing speeds, soaking of the charts at slow writing speeds, and tearing the charts. Further the new pen is relatively inexpensive and greatly facilitates cleaning of the pen. The level of the ink reservoir, being independently adjustable with respect to the nib, allows the ink flow to the nib to be very closely adjusted to the writing speed. An adjustable foot 32 allows the nib 26 to be maintained slightly off-the-surface of the paper 38 such that wear of the pen is substantially reduced. Further, the "off-paper" type writing greatly increases speeds at which the pen may write without skipping.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A pen for writing on a surface comprising a nib, means for supplying a writing fluid to said nib, said nib having a capillary-size bore, the portion of said bore adjacent said surface being enlarged to define a reservoir cavity for said writing fluid, said cavity defining a mouth, the cross-sectional area of which is greater than that of a capillary-size bore, and means integrally associated with said nib for maintaining a selectably predetermined gap between said nib and said surface, whereby no part of said nib is in contact with said surface and the wearing of said nib is substantially reduced.

2. The combination set forth in claim 1 wherein said nib is tubular.

3. A pen for writing a continuous record on a surface by reason of relative movement between said pen and said surface comprising a nib having a capillary size bore, means connected to said nib for supplying a colored writing fluid to said nib, said nib having a capillary-size bore, the portion of said bore adjacent said surface being enlarged to define a reservoir cavity for said writing fluid, said cavity defining a mouth, the cross-sectional area of which is greater than that of a capillary-size bore, and means integrally associated with said nib for maintaining a predetermined gap between said nib and said surface whereby no part of said nib is in contact with said surface and the wearing of said nib is substantially reduced, said means for maintaining a predetermined gap between said nib and said surface being adjustable for varying said gap thereby to accommodate different writing speeds caused by the rate of relative movement between said pen and said surface.

4. A pen for writing a continuous record on a surface by reason of relative movement between said pen and said surface comprising a nib, means for supplying a fluid to said nib, said nib having a capillary-size bore, the portion of said bore adjacent said writing surface being enlarged to define a reservoir cavity for said fluid, said cavity defining a mouth, the cross-sectional area of which is greater than that of a capillary-size bore, and means integrally associated with said nib for maintaining a predetermined gap between said nib and said surface, whereby no part of said nib is in contact with said surface and the wearing of said nib is substantially reduced, said means for maintaining a predetermined gap between said nib and said surface being adjustable for varying said gap thereby to accommodate different writing speeds, said adjustable means also including a gap adjusting foot mounted integrally and intimately with said nib and adapted to ride on said surface thereby to maintain said predetermined gap caused by the rate of relative movement between said pen and said surface.

5. A pen for writing a continuous record on a surface by reason of relative movement between said pen and said surface comprising a nib having a capillary size bore, and means connected to said nib to supply ink to said nib, that portion of said bore adapted to be adjacent said surface being enlarged to provide a reservoir capacity for said ink thereby to allow increased writing speeds, said enlarged portion defining a mouth, the cross-sectional area of which is greater than that of a capillary-size bore.

6. A pen for writing a continuous record on a surface by reason of relative movement between said pen and said surface comprising a nib having a capillary size bore, and separate means connected to said nib for supplying ink to said nib, that portion of said bore adapted to be adjacent said writing surface being conical in shape such that the meet angle between said surface and the trailing edge of said bore is less than 90° thereby to form an acute angle between said surface and said conical bore, whereby relative movement between said pen and said surface dislodges any particles which may accumulate in said bore from said surface and the tendency of said pen to clog is reduced.

7. In a recorder of the type having an ink pen, a chart roll movable into operative position with respect to the ink pen, and power means for unrolling the chart whereby the ink pen draws a record on the chart surface during such periods when the chart roll is in the operative position, the combination of a frame member including a pointer, a slide rod disposed substantially parallel to the axis of said chart roll, a bearing member secured to said frame member and slidable along said slide rod, said pen being carried by said frame member, said pen including a nib aligned with said pointer, said nib having a capillary-size bore, the portion of said bore adjacent said chart being enlarged to define a reservoir cavity defining a mouth, the cross-sectional area of which is greater than that of a capillary size bore, and an adjustable foot means also carried by said frame member and adapted to ride on said chart at a point contiguous to said nib for maintaining a predetermined gap between said nib and said chart roll, whereby greater writing speeds with reduced nib wear are achieved.

8. In a recorder of the type having an ink pen, a chart roll movable into operative position with respect to the ink pen, and power means for unrolling the chart whereby the ink pen draws a record on the chart surface during the periods when the chart roll is in the operative position, the combination of a frame member including a pointer, a slide rod disposed substantially parallel to the axis of the chart roll, a bearing member secured to said frame member and slidable along said slide rod, said pen being carried by said frame member, said pen including a nib aligned with said pointer, a separate ink vial carried by said frame member, capillary tube means connecting said ink vial to said nib, thereby to facilitate cleaning of said nib, said nib having a capillary-size bore, the portion of said bore adjacent said chart being enlarged to define a reservoir cavity defining a mouth, the cross-sectional area of which is greater than that of a capillary-size bore, and an adjustable foot means carried by said frame member and adapted to rest against said chart roll at a point contiguous to said nib for maintaining a predetermined gap between said nib and said chart roll, whereby no part of said nib contacts said chart and greater writing speeds with reduced nib wear are achieved.

9. In a recorder of the type having an ink pen, a chart roll movable into operative position with respect to the ink pen, and power means for unrolling the chart whereby the ink pen draws a trace on the chart surface during such periods when the chart roll is in the operative position, the combination wherein said ink pen comprises a frame member having a pointer, a slide rod disposed substantially parallel to the axis of said chart roll, a bearing member secured to said frame member and slidable along said slide rod, a nib having a capillary size bore mounted on said frame member and aligned with said pointer, the portion of said bore adjacent said chart being enlarged to define a reservoir cavity for said ink, said cavity defining a mouth, the cross-sectional area of which is greater than that of a capillary-size bore, a separate ink vial also mounted on said frame member, capillary tube means connecting said ink vial to said nib for transferring ink from said vial to said nib, thereby to facilitate cleaning of said nib, and an adjustable foot means mounted on said frame member closely adjacent said nib and adapted to rest against said chart roll for maintaining a predetermined gap between said nib and said chart roll, whereby no part of said nib contacts said chart roll and greater writing speeds with reduced nib wear are possible.

10. In a recorder of the type having an ink pen, a chart roll movable into operative position with respect to the ink pen, and power means for unrolling the chart whereby the ink pen draws a trace on said chart during such periods when the chart roll is in its operative position, the combination wherein said ink pen comprises a frame member having a pointer, a slide rod disposed substantially parallel to the axis of said chart roll, a bearing member secured to said frame member and slidable along said slide rod, a tubular nib having a capillary size bore mounted on said frame member and aligned with said pointer, the portion of said bore adjacent said chart being enlarged to define a mouth, the cross-sectional area of which is greater than that of a capillary-size bore, a separate ink vial adjustably mounted on said frame member, capillary tube means connecting said ink vial to said nib for transferirng ink from said vial to said nib, thereby to facilitate cleaning of said nib, said ink vial being adjustable in height with respect to the height of said nib above said chart roll thereby to vary the ink flow from said vial to said nib to adjust to different writing speeds, and an adjustable foot means mounted on said frame member closely adjacent said nib and adapted to rest against said chart roll for maintaining a predetermined gap between said nib and said chart roll, whereby no part of said nib contacts said chart roll and said gap may be varied to accommodate different writing speeds.

11. In a recorder of the type having an ink pen, a chart roll manually movable into operative position with respect to the ink pen and power means for unrolling the chart whereby the ink pen traces a record on the chart surface during such periods when the chart roll is in the operative position, the combination of a frame member including a pointer, a slide rod disposed substantially parallel to the axis of the chart roll, a bearing member secured to said frame member and slidable along said slide rod, said pen being mounted on said frame member, said pen including a tubular nib, said nib having a capillary-size bore, the portion of said bore adjacent said chart being enlarged to define a reservoir cavity for said ink, said cavity defining a mouth, the cross-sectional area of which is greater than that of a capillary-size bore, a separate ink vial mounted on said frame, and removable capillary tube means connecting said ink vial to said nib, thereby to facilitate cleaning of said nib.

12. In a recorder of the type having an ink pen, a chart roll manually movable into operative position with respect to the ink pen and power means for unrolling the chart roll whereby the ink pen draws a trace on the chart surface during such periods when the chart roll is in the operative position, the combination of a frame member including a pointer, a slide rod disposed substantially parallel to the axis of the chart roll, a bearing member secured to said frame member and slidable along said slide rod, said pen being mounted on said frame member, said pen including a tubular nib, a separate ink vial adjustably mounted on said frame to vary the level of said ink vial with respect to said nib, whereby the ink flow from said vial to said nib may be adjusted to accommodate different writing speeds, capillary tube means connecting said ink vial to said nib thereby to facilitate cleaning of said nib, and an adjustable foot means mounted on said frame member and adapted to rest against said chart roll for maintaining a predetermined gap between said nib and said chart roll whereby no portion of said nib contacts said chart roll, said nib comprising a capillary size tube of a relatively rigid material, the portion of said tube adjacent said chart being enlarged to define a reservoir cavity for said ink, said cavity defining a mouth, the cross-sectional area of which is greater than that of a capillary-size bore.

13. In a recorder of the type having an ink pen, a chart roll manually movable into operative position with respect to the ink pen, and power means for unrolling the chart whereby the ink pen traces a record on the chart during such periods when the chart roll is in its operative position, the combination of said ink pen having a nib for marking on said chart surface, said nib having an ink feed end, said ink-feed end having a capillary-size bore, a writing end and a capillary bore for transporting ink from said ink feed end to said writing end, said writing end defining a reservoir cavity having a mouth, the cross-sectional area of which is greater than that of a capillary-size bore, the periphery of said writing end being bevelled to reduce the meet angle between said chart surface and the outside edge of said nib whereby the particles which would normally accumulate at said periphery are forced into the acute angle formed by the writing surface and the outside edge of said nib, whereby movement of the pen dislodges said particles from said leading edge of said nib thereby to reduce blotting and bleeding of the ink on said chart.

14. An ink pen for writing a continuous record on a writing surface by reason of relative movement between said pen and said surface comprising:
a nib having a capillary-size bore,
a separate ink vial,
capillary tube means connected between said vial and said nib to supply ink from said vial to said nib,
an adjustable means supporting said vial for varying the level of said vial with respect to the level of said nib thereby to vary the ink flow to said nib,
adjusting means secured to said nib and supported by said writing surface for varying the space between said nib and said writing surface thereby to accommodate different writing speeds,
the portion of said bore adjacent said writing surface being enlarged to provide a reservoir cavity for additional ink thereby to allow increased writing speeds,
said enlarged portion being conical in shape such that the meet angle between the surface and the trailing edge of the bore is less than 90° whereby particles which normally accumulate in the bore of said nib are forced into the wedge formed by the writing surface and the conical bore whereby movement of the pen dislodges said particles from said bore and the clogging tendency in the bore is reduced.

15. The pen set forth in claim 14 wherein said meet angle between said surface and bore of said nib is approximately 50°.

16. The pen set forth in claim 15 wherein the periphery of that portion of said nib adjacent said writing surface is beveled to reduce the meet angle between the outside surface of said nib and said writing surface thereby to minimize the accumulation of particles about said nib and reduce blotting of the ink on said writing surface.

References Cited in the file of this patent

UNITED STATES PATENTS

| 899,043 | Harris | Sept. 22, 1908 |
| 992,010 | Lanphier | May 9, 1911 |
| 2,606,093 | Reason | Aug. 5, 1952 |
| 2,673,138 | Bartley et al. | Mar. 23, 1954 |
| 2,800,385 | Cannon | July 23, 1957 |
| 2,842,421 | Dreyfus | July 8, 1958 |

FOREIGN PATENTS

| 536,410 | Italy | Dec. 2, 1955 |
| 1,116,392 | France | Jan. 30, 1956 |